(12) United States Patent
Skachkov et al.

(10) Patent No.: US 12,350,621 B2
(45) Date of Patent: Jul. 8, 2025

(54) BOX CHAIN CONVEYOR ADSORPTION MOVING BED WITH HEAT INTEGRATION

(71) Applicant: Schlumberger Technology Corporation, Sugar Land, TX (US)

(72) Inventors: Roman Alexandrovich Skachkov, Cambridge, MA (US); Shahnawaz Hossain Molla, Cambridge, MA (US); Davuluri Prahlada Rao, Hyderabad (IN); Sandeep Verma, Cambridge, MA (US); Bruno Lecerf, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/775,253

(22) Filed: Jul. 17, 2024

(65) Prior Publication Data
US 2025/0025827 A1     Jan. 23, 2025

Related U.S. Application Data

(60) Provisional application No. 63/611,262, filed on Dec. 18, 2023, provisional application No. 63/513,910, filed on Jul. 17, 2023.

(51) Int. Cl.
    *B01D 53/08*     (2006.01)
    *B01D 53/04*     (2006.01)

(52) U.S. Cl.
    CPC ......... *B01D 53/08* (2013.01); *B01D 53/0462* (2013.01); *B01D 2253/102* (2013.01);
(Continued)

(58) Field of Classification Search
    CPC ............... B01D 53/08; B01D 53/0462; B01D 2257/504; B01D 2253/342;
(Continued)

(56) References Cited

U.S. PATENT DOCUMENTS

| | | |
|---|---|---|
| 7,594,956 B2 | 9/2009 | Knaebel |
| 8,715,394 B2 | 5/2014 | Caram |

(Continued)

FOREIGN PATENT DOCUMENTS

| | | |
|---|---|---|
| CN | 110691638 A | 1/2020 |
| CN | 106563428 B | 7/2020 |

(Continued)

OTHER PUBLICATIONS

Kim, K. et al., "Moving bed adsorption process with internal heat integration for carbon dioxide capture", International Journal of Greenhouse Gas Control, 2013, 17, pp. 13-24.
(Continued)

*Primary Examiner* — Youngsul Jeong
(74) *Attorney, Agent, or Firm* — Jeffrey D. Frantz

(57) ABSTRACT

Systems and methods presented herein provide for a box chain conveyor adsorption moving bed that separates carbon dioxide from a gas mixture. A box chain conveyor is oriented around a wall, including a chain that moves in a closed loop around the wall. One side of the box chain conveyor is in an adsorption section and an opposite second side is in a desorption section. Particle boxes contain adsorbent particles, and the chain moves the particle boxes around the wall in the closed loop. Heated gas passes through the desorption section, causing $CO_2$ to desorb from particle boxes in the desorption section. Desorbed $CO_2$ is expelled from an output.

20 Claims, 2 Drawing Sheets

(52) U.S. Cl.
CPC .. *B01D 2253/104* (2013.01); *B01D 2253/108* (2013.01); *B01D 2253/204* (2013.01); *B01D 2253/342* (2013.01); *B01D 2257/504* (2013.01)

(58) Field of Classification Search
CPC ........ B01D 2253/104; B01D 2253/102; B01D 2253/108; B01D 2253/204
See application file for complete search history.

(56) References Cited

U.S. PATENT DOCUMENTS

| | | | |
|---|---|---|---|
| 9,073,004 | B2 | 7/2015 | Ogino |
| 10,232,307 | B2* | 3/2019 | Sprachmann ............ B01J 8/189 |
| 2014/0251136 | A1* | 9/2014 | Park ................... B01D 53/0462 96/126 |
| 2016/0175760 | A1 | 6/2016 | Sadler |
| 2021/0039036 | A1* | 2/2021 | Okano ................... B01D 53/06 |
| 2021/0187438 | A1 | 6/2021 | Nishibe |
| 2021/0339188 | A1* | 11/2021 | Bhalodi ............... B01J 20/3204 |
| 2025/0025826 | A1 | 1/2025 | Skachkov |

FOREIGN PATENT DOCUMENTS

| | | |
|---|---|---|
| CN | 112312993 A | 2/2021 |
| JP | 4354788 B2 | 10/2009 |
| JP | 4986822 B2 | 7/2012 |
| JP | 5449187 B2 | 3/2014 |
| JP | 5529374 B2 | 6/2014 |
| KR | 100949525 B1 | 3/2010 |
| KR | 20120091156 A | 8/2012 |
| KR | 101263363 B1 | 5/2013 |
| KR | 20140077466 A | 6/2014 |
| KR | 20200063223 A | 6/2020 |
| SU | 1223974 A1 | 4/1986 |
| TW | 201141598 A | 12/2011 |
| WO | 2022043050 A1 | 3/2022 |

OTHER PUBLICATIONS

Mondino, G. et al., "Evalutation of MBTSA technology for CO2 capture from waste-to-energy plants", International Journal of Greenhouse Gas Control, 2022, 118, 103685, 17 pages.

* cited by examiner

BOX CHAIN CONVEYOR ADSORPTION MOVING BED WITH HEAT INTEGRATION

CROSS-REFERENCE TO RELATED APPLICATION

The present disclosure claims priority from U.S. Provisional Application No. 63/513,910, filed Jul. 17, 2023, entitled "BOX CHAIN CONVEYOR ADSORPTION MOVING BED WITH HEAT INTEGRATION", and U.S. Provisional Application No. 63/611,262, filed Dec. 18, 2023, entitled "BOX CHAIN CONVEYOR ADSORPTION MOVING BED WITH HEAT INTEGRATION", both of which are herein incorporated by reference in their entirety.

BACKGROUND

Carbon dioxide ($CO_2$) can be a byproduct of many industrial processes. For environmental and other concerns, there is often a need to capture and manage the $CO_2$ output. This process is known as carbon capture and storage (CCS) and is a critical technology for reducing greenhouse gas emissions and mitigating climate change.

As one example, $CO_2$ injection can enhance oil recovery, increasing the amount of oil that is extracted from a reservoir. $CO_2$ can lower the viscosity of the oil and make it easier to extract. The $CO_2$ also helps to displace the oil from the reservoir and push it towards the production well. However, it is often desirable to eventually separate injected $CO_2$ from a gas mixture.

Left unabated, the $CO_2$ can have both environmental impacts as well as functional impacts on the well. For example, in the context of oil wells, $CO_2$ can cause several different problems. One problem is corrosion. $CO_2$ can dissolve in water to form carbonic acid, which can cause corrosion of metal surfaces in oil wells, including pipes and other equipment. This can lead to leaks and equipment failures. Another issue is reduced oil recovery. $CO_2$ can displace oil in reservoirs, making it more difficult to recover. This can result in decreased oil production and lower yields.

$CO_2$ can also lead to reduced reservoir pressure. $CO_2$ injection into oil wells to enhance oil recovery can result in reduced reservoir pressure, which can make it more difficult to recover oil and can also cause a decline in well productivity. Additionally, managing $CO_2$ in oil wells can be expensive, including the cost of monitoring and mitigating corrosion, managing reservoir pressure, and implementing $CO_2$ injection systems for enhanced oil recovery.

Overall, while $CO_2$ injection can be an effective method for enhanced oil recovery, it requires careful management to avoid negative impacts on oil well infrastructure and production.

New systems and methods are needed to separate $CO_2$ from a gas mixture, particularly within the context of oil wells.

SUMMARY

The examples described herein allow for separating $CO_2$ from a gas mixture. A box chain conveyor adsorption moving bed ("BCCAMB") can receive the gas mixture at an inlet. Adsorbent particles within the BCCAMB can adsorb the $CO_2$.

In this design, the adsorbent particles are transported between the adsorption section of a reactor and the desorption section. The adsorption section can be right-hand side and the desorption side can be the left-hand side, or vice versa. But a first side can be for adsorption and a second side can be for desorption. Particle transport can be facilitated by a chain conveyor moving in a closed loop around an impenetrable wall.

The conveyor can be driven by gear wheels located at the top and bottom of the wall and connected to a motor. The chain of the conveyor is in a mechanically flexible connection with the adsorbent boxes, which execute loop transport of the adsorbent particles through adsorption and desorption parts of the bed alternately. Mesh-like walls of the boxes have specific cells sized to be able to easily pass fluids through and to keep adsorbent particles inside at the same time. This results in the adsorbent particles being kept in almost the same position. In some embodiments, each adsorbent box is filled with adsorbent particles and is configured to reduce or eliminate the shifting or settling of the adsorbent particles during movement through the loop transport. The adsorbent particles do not undergo strong friction with each other or the boxes, which means a moderate or low level of their attrition. This advantage allows for longer operation of the system without intervention to replace the adsorbent particles.

At the same time, the adsorbent particles are shaken while the boxes move. This allows for the space distribution of the adsorbent particles to be close to uniform. To ensure a correct gas flow pattern, the boxes are equipped with skirt-like seals. Liquid can be situated at bottom of the reaction to pass boxes with adsorbent while the gas flow is blocked between the adsorption and desorption parts of the bed.

The box chain conveyor can also provide another advantage with balanced left-to-right weight. This ensures that movement energy is expended mainly on overcoming frictional forces, which are not significant in the case of slow motion.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EXAMPLES

Reference will now be made in detail to the present exemplary examples, including examples illustrated in the accompanying drawings. Wherever possible, the same reference numbers will be used throughout the drawings to refer to the same or like parts. The described examples are non-limiting.

Figure 1:
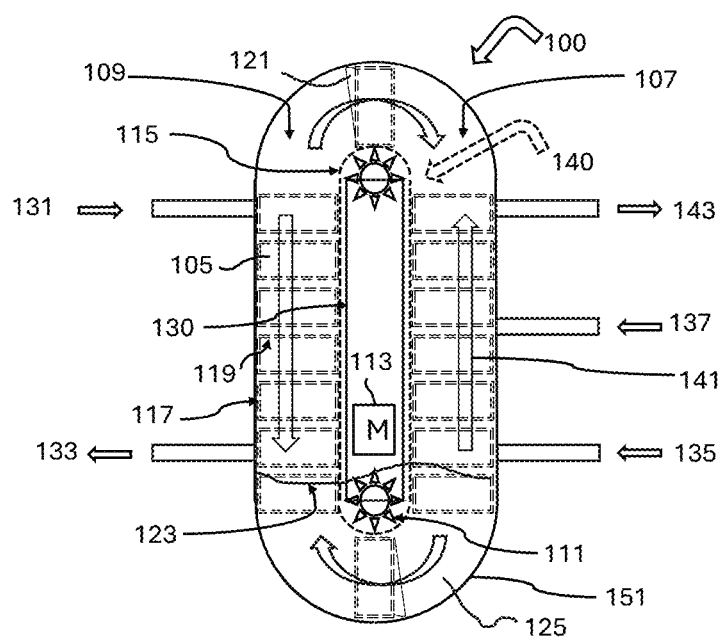
FIG. 1 is an example cross-sectional side-view illustration of a box chain conveyor adsorption moving bed with heat integration.

FIG. 1 is an example cross-sectional side-view illustration of a box chain conveyor adsorption moving bed with heat integration 100. The BCCAMB 100 separates $CO_2$ from a gas mixture entering through the inlet. The $CO_2$ is adsorbed into the adsorbent particles 105. The adsorbent particles are transported between the adsorption section 107 of the reactor 100, which is on a first side, and a desorption section 109, which is on a second and opposite side. For example, the adsorption section 107 can be right of a vertically integrated box chain conveyor 140 and the desorption section 109 can be on the left, as illustrated in FIG. 1.

The particle transport is facilitated by the box chain conveyor 140. The box chain conveyor 140 includes a chain 115 that moves in a closed loop around an impenetrable wall 130. The conveyor 140 can be driven by gear wheels 111 located at the top and bottom of the wall 130 and connected to a motor 113. Although described herein as a chain, it is understood that a belt or other means of continuous conveyance may be utilized to move particle boxes around the wall between the adsorption section 107 and the desorption section 109.

The chain 115 of the conveyor 140 is in a mechanically flexible connection with the adsorbent boxes 117, which execute loop transport of the adsorbent particles 105 through the adsorption section 107 and desorption section 109 of the bed alternately. Mesh-like walls 119 of the boxes 117 can have specific cells sized to be able to easily pass fluids through and to keep particles 105 inside at the same time. This allows the adsorbent particles 105 to be kept in almost the same position without undergoing strong friction, advantageously leading to a moderate or low level of their attrition.

At the same time, the boxes 117 are being shaken while moving through the loop transport, which allows the adsorbent particle 105 space distribution close to uniform within the boxes 117. The boxes 117 can be equipped with skirt-like seals 121 to ensure a desired gas flow pattern through the boxes 117 without flowing directly between the adsorption section 107 and the desorption section 109.

This configuration also advantageously supports left-to-right weight balance of the boxes within the reactor 100. Movement energy is expended mainly on overcoming frictional forces, which are not significant in the case of slow motion.

Liquid 123 is situated at bottom of the reactor 100. For example, in FIG. 1, a sealing liquid 123 fills the bottom part 125 of the reactor 100 wherein at least part of the impenetrable wall 130 is flooded. The liquid 123 allows the boxes 117 with adsorbent particles 105 to pass while gas flow is blocked between the adsorption section 107 and the desorption section 109. The conveyor 140 can drive the adsorbent boxes 117 down into the liquid 123 from the adsorption section 107, around the wall 130, and into the desorption side 109 of the reactor 100. The liquid 123 may be water, solvent, oil, or other liquid configured to inhibit flow of gas between the adsorption section 107 and the desorption section 109.

Heated gas 131 can be applied for desorption. Temperature swing adsorption ("TSA") is one type of desorption technique. In TSA, $CO_2$ is desorbed from a solid adsorbent material by raising the temperature of the material. This causes the adsorbed $CO_2$ to become less stable and more easily released from the material. When this happens, the desorbed $CO_2$ can pass through an output 133.

With TSA, the system can heat the adsorbent material 105 to release the adsorbed $CO_2$. First, the adsorbent particles are exposed to a gas stream 135 containing $CO_2$. The $CO_2$ molecules adsorb into the adsorbent particles 105. The adsorbent particles 105 can be part of a porous solid such as zeolite, activated carbon, or metal-organic frameworks ("MOFs"). One of best absorbent material for this kind of moving bed is alumina impregnated with $Na_2CO_3$ or $K_2CO_3$ while the most cheap material is crusted stone chips. All possible adsorbent materials are not limited by the aforementioned examples.

In one example, the adsorption section 107 is maintained at a lower temperature than the desorption section 107.

Heated gas 131 from a heat exchanger can be used for desorption, causing the $CO_2$ molecules to desorb from the adsorbent material and to be released into the gas stream 133. The $CO_2$ can then flow downwards into an outlet that expels the desorbed $CO_2$ 133.

After desorption, the gas stream can be purged with a low-pressure gas, such as nitrogen, to remove any remaining $CO_2$. The adsorbent material 105 in the boxes 117 exiting the desorption section 109 is then ready to be used again for $CO_2$ adsorption, and the cycle can be repeated.

The adsorbent particles 105 can move downward in the adsorption section of the reactor while the gas in that section moves upward as shown by arrow 141. A cooled gas 137 can be used in $CO_2$ adsorption to separate and capture $CO_2$ from gas mixtures, such as those emitted by power plants and other industrial processes. Cooled gas 137 entering from the heat exchanger can be a mix of mostly nitrogen with relatively small quantities of $CO_2$. Nitrogen is a relatively inert gas that does not interact significantly with the $CO_2$ or the adsorbent particles 105. In some embodiments, the adsorbent particles 105 are selected for a desirable selectivity of $CO_2$/nitrogen ratio for the operating temperature ranges. Example adsorbent particles 105 can include activated carbon, zeolites, or metal-organic frameworks (MOFs), that selectively bind the $CO_2$ molecules. One of best absorbent material for this kind of moving bed is alumina impregnated with $Na_2CO_3$ or $K_2CO_3$ while the most cheap material is crusted stone chips. All possible adsorbent materials are not limited by the aforementioned examples. A $CO_2$-lean gas 143 may exit the absorption section 107 of the reactor 100.

Figure 2:
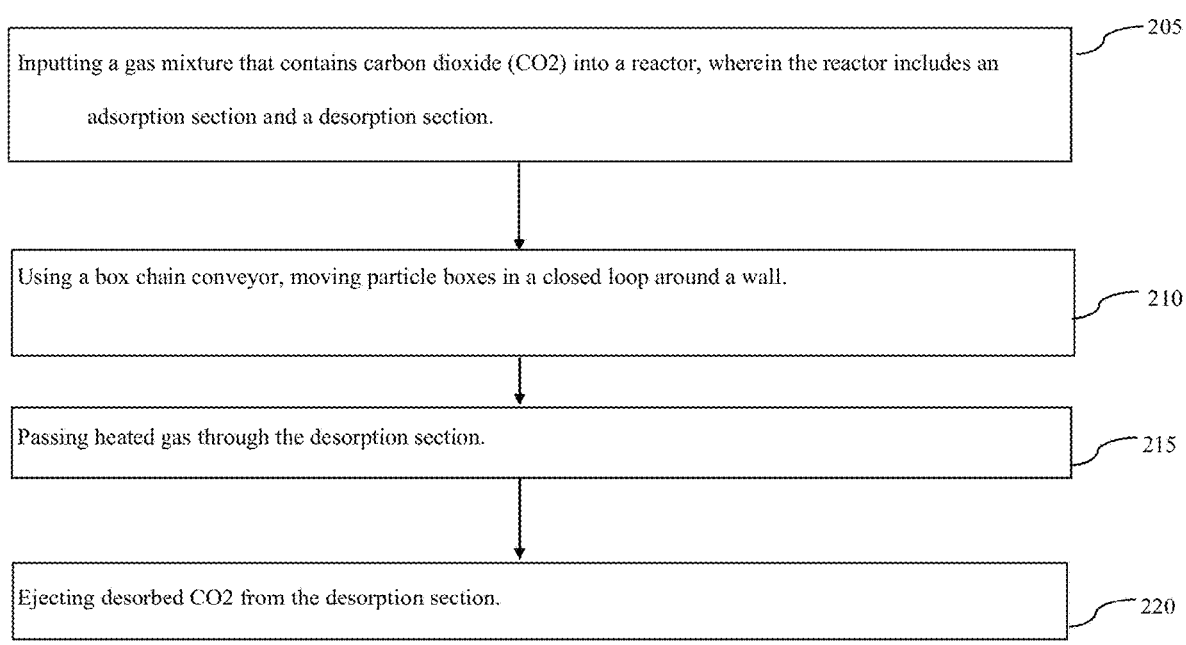
FIG. 2 is an example flow chart of a method for extracting $CO_2$ from gas.

FIG. 2 is an example flow chart of a method for extracting $CO_2$ from gas.

At stage 205, a gas mixture that contains carbon dioxide ($CO_2$) is input into a reactor. The reactor includes an adsorption section and a desorption section. The gas mixture can be fed into the adsorption section.

At stage 210, a box chain conveyor moves particle boxes in a closed loop around a wall. The wall can be oriented vertically in the reactor with the box chain conveyor forming its closed loop around the wall. One side of the box chain conveyor can be in the adsorption section and an opposite second side in the desorption section. This can allow the box chain conveyor to move the particle boxes continuously between the sections.

The particle boxes are attached to the box chain conveyor and contain adsorbent particles. Adsorbent particles are exposed to a gas mixture that contains $CO_2$. This exposure occurs in an outer container that acts as an adsorption section. Particles that have a high surface area and are porous can adsorb $CO_2$. As one example, activated carbon particles are particles of carbon material that have been treated with oxygen to create a high surface area and high porosity. Activated carbon particles can adsorb $CO_2$. Metal-organic framework (MOF) particles are made up of metal ions and organic ligands that create a highly porous, crystalline structure. MOF particles have a large surface area and tunable pore sizes, which make them effective at capturing $CO_2$. Silica particles are made of silicon dioxide ($SiO2$) that can adsorb moisture and other small molecules, including $CO_2$. Zeolite particles are made of porous minerals that have high surface areas and can trap $CO_2$ in their channels. Polymeric particles are made of polymers that have been designed to contain amine groups, which can chemically react with $CO_2$ to form stable complexes. One of best absorbent material for this kind of moving bed is alumina impregnated with $Na_2CO_3$ or $K_2CO_3$ while the most cheap is crusted stone chips. All possible adsorbent materials are not limited by the aforementioned examples.

The particle boxes can include meshed walls that allow passage of liquid while retaining the adsorbent particles. The closed loop of the chain can transport the particle boxes beneath the wall. The bottom portion of the reactor can be filled with sealing liquid, such that moving the particle boxes around the underside of the wall involves submerging them in the liquid. Doing so can block passage of the gas mixture while allowing the adsorbent particles to continue onward to the desorption section in the particle boxes.

In the adsorption section, the gas mixture moves upwards and the particle boxes move downwards. The opposite can be the case for both in the desorption section.

The wall can be oriented vertically. The box chain conveyor can include a first gear at the top of the wall and a second gear at the bottom of the wall. A chain transmission for the box chain conveyor can be inside the wall in an example.

The particle boxes can include skirt seals that direct a gas flow pattern through the particle boxes. The particle boxes can hold the adsorbent particles in substantially a same position.

The box chain conveyor can be oriented in the reactor to maintain a weight balance from left-to-right. In one example, the box chain conveyor and particle boxes are within a prismatic housing 151.

At stage 215, the system can pass heated gas through the desorption section, causing $CO_2$ to desorb from particle boxes in the desorption section. The $CO_2$ can flow out of the mesh of the particle boxes and into the gas output line. This results in ejecting desorbed $CO_2$ from the desorption section in stage 220.

Desorption is the process of removing the adsorbed molecules from an adsorbent particle. One way to desorb $CO_2$ from an adsorbent particle is by using heat. The desorption process is carried out in a separate unit from the adsorption unit and involves heating the adsorbent particle to a higher temperature, which causes the adsorbed $CO_2$ to desorb.

The system can use thermal swing adsorption (TSA), which involves cyclically heating and cooling the adsorbent particles to remove the adsorbed gas. In one example, the adsorbent particle is heated to a temperature that is higher than the temperature at which $CO_2$ adsorption occurs. This increases the kinetic energy of the $CO_2$ molecules, weakening the bond between the $CO_2$ molecules and the adsorbent.

Adsorbent Particles

The current disclosure may be used with any type of adsorbent particles enabling $CO_2$ uptake. Such adsorbent particles may include zeolites, or activated carbons (also called porous carbons), alkanized alumina, known for their high surface areas and porosity. These materials physically adsorb $CO_2$ molecules, primarily through van der Waals forces. Adsorbents may also include chemical adsorbents, such as amine-functionalized solids, react chemically with carbon dioxide to form stable compounds, facilitating efficient capture. Types of adsorbent particles may also include Metal-Organic Frameworks (MOFs), a newer class of sorbents, having a highly customizable structure and exceptional porosity. These hybrid materials, composed of metal ions and organic linkers, can be tailored to enhance $CO_2$ affinity and selectivity. MOFs demonstrate superior $CO_2$ uptake capacities compared to traditional sorbents, especially at low pressures, making them ideal for post-combustion capture scenarios. Exemplary MOFs that can be used for $CO_2$ uptake include MOFs from the SIFSIX series, such as SIFSIX-1-Cu, SifSIX-2-Cu, SIFSIX-2-Cu-i, SIFSIX-3-Zn, et SIFSIX-3-Cu, and/or HKUST-1 and/or MIL-53(M), with M being a metal such as Fe, Cu or Al, and/or MIL-96 and/or UiO-66 and/or UiO-66-NH2.

In an embodiment, the adsorbent particles include a Metal-Organic Frameworks (MOFs) that includes several MOF crystals bound together, forming optionally a monolithic MOF. It represents an advanced form of MOF materials, distinct from its conventional powdered counterparts and designated as m-MOF in the following. Such m-MOFs are essentially solid, continuous structures, often exhibiting porous architecture, offering several advantages including reduced pressure drop relative to powdered counterparts, enhanced mechanical stability, improved scalability and/or handling. Such m-MOF may have a volume more important than a powdered MOF, for instance a volume higher than 0.1 $mm^3$, optionally 1 $cm^3$.

Other embodiments of the invention will be apparent to those skilled in the art from consideration of the specification and practice of the invention disclosed herein. It is understood that the control functionality can be carried out be a processor-enabled device. It is intended that the specification and examples be considered as exemplary only, with a true scope and spirit of the invention being indicated by the following claims.

What is claimed is:

1. A method for removing carbon dioxide from gas, comprising:
    inputting a gas mixture that contains carbon dioxide ($CO_2$) into a reactor, wherein the reactor includes an adsorption section and a desorption section;
    using a box chain conveyor, moving particle boxes in a closed loop around a wall,
        wherein the box chain conveyor is oriented around the wall inside the reactor,
        wherein one side of the box chain conveyor is in the adsorption section and an opposite second side is in the desorption section, and
        wherein particle boxes are attached to the box chain conveyor and contain adsorbent particles;
    passing cooled gas through the adsorption section, causing $CO_2$ to adsorb into particle boxes in the adsorption section;
    passing heated gas through the desorption section, causing $CO_2$ to desorb from particle boxes in the desorption section; and
    ejecting desorbed $CO_2$ from the desorption section.

2. The method of claim 1, wherein the particle boxes include meshed walls that allow passage of a liquid through the particle boxes while retaining the adsorbent particles.

3. The method of claim 1, wherein moving the particle boxes around the wall includes submerging the particle boxes in a liquid that inhibits flow of gas between the adsorption section and the desorption section.

4. The method of claim 1, wherein gas moves upwards and the particle boxes move downwards within the adsorption section.

5. The method of claim 1, wherein the wall is oriented vertically and the box chain conveyor includes a first gear at the top of the wall and a second gear at the bottom of the wall.

6. The method of claim 1, wherein the particle boxes include skirt seals that direct a gas flow pattern through the particle boxes of the adsorption section or the desorption section.

7. The method of claim 1, wherein the particle boxes hold the adsorbent particles in a substantial same position.

8. The method of claim 1, wherein the adsorbent particles include a Metal-Organic Framework (MOF).

9. The method of claim 8, wherein the adsorbent particles include a MOF having one or more bonded MOF crystals.

10. The method of claim 9, wherein the adsorbent particles include a monolithic MOF.

11. The method of claim 1, wherein the adsorbent particles include a porous carbon, alkalized alumina, zeolite or amine-functionalized sorbent.

12. A box chain conveyor adsorption moving bed that operates as part of a reactor, comprising:
   an input for a gas mixture that contains carbon dioxide ($CO_2$);
   a box chain conveyor oriented around a wall, including a chain that moves in a closed loop around the wall,
      wherein one side of the box chain conveyor is in an adsorption section and an opposite second side is in a desorption section, and
   particle boxes that are attached to the chain and contain adsorbent particles, wherein the chain moves the particle boxes around the wall in the closed loop;
   a cooled gas line that passes through the adsorption section, causing $CO_2$ to adsorb into particle boxes in the adsorption section;
   a heated gas line that passes through the desorption section, causing $CO_2$ to desorb from particle boxes in the desorption section; and
   an output for desorbed $CO_2$.

13. The box chain conveyor adsorption moving bed of claim 12, wherein the particle boxes include meshed walls that allow passage of liquid while retaining the adsorbent particles.

14. The box chain conveyor adsorption moving bed of claim 12, comprising a liquid at a bottom part of the reactor configured to interface with the wall and the reactor to inhibit passage of the gas mixture between the adsorption section and the desorption section, and the liquid is configured to permit movement of the particle boxes around the wall via submerging the particle boxes in the liquid.

15. The box chain conveyor adsorption moving bed of claim 12, wherein the wall is oriented vertically and the box chain conveyor includes a first gear at the top of the wall and a second gear at the bottom of the wall.

16. The box chain conveyor adsorption moving bed of claim 12, wherein the particle boxes include skirt seals that direct a gas flow pattern through the particle boxes.

17. The box chain conveyor adsorption moving bed of claim 12, wherein the adsorbent particles include a Metal-Organic Framework (MOF).

18. The box chain conveyor adsorption moving bed of claim 17, wherein the adsorbent particles include a MOF having one or more bonded MOF crystals.

19. The box chain conveyor adsorption moving bed of claim 18, wherein the adsorbent particles include a monolithic MOF.

20. The box chain conveyor adsorption moving bed of claim 12, wherein the adsorbent particles include a porous carbon, alkalized alumina, zeolite or amine-functionalized sorbent.

* * * * *